United States Patent Office 3,725,248
Patented Apr. 3, 1973

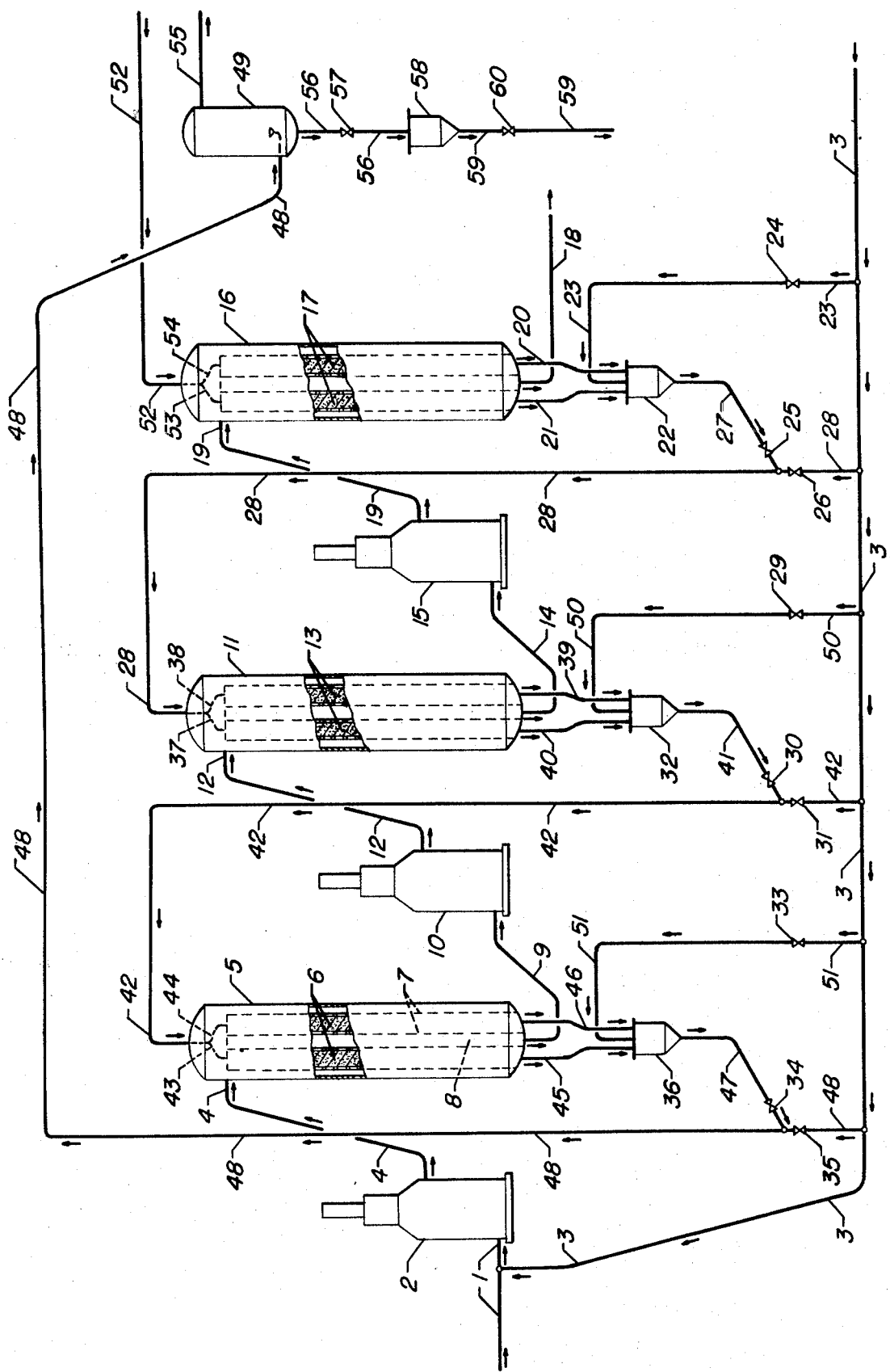

3,725,248
METHOD OF OPERATING A REFORMING PROCESS
Arthur Raymond Greenwood, Niles, and Kenneth Donald Vesely, Arlington Heights, Ill., assignors to Universal Oil Products Company, Des Plaines, Ill.
Continuation-in-part of application Ser. No. 860,905, Sept. 25, 1969, now Patent No. 3,647,680. This application Dec. 14, 1971, Ser. No. 207,910
Int. Cl. C10g 35/06
U.S. Cl. 208—138  18 Claims

ABSTRACT OF THE DISCLOSURE

A method of operating a reforming process employing a platinum group metal catalyst. A multiple reactor system comprising the side-by-side reactors is employed, each reactor containing a dense-phase moving catalyst bed. The method of this invention enables processing of the catalyst through the reactor system in series flow, all reactors remaining on stream at reforming conditions. The method provides for relatively frequent regeneration, and catalyst activity is maintained at a predetermined high level without resort to increasingly severe reforming conditions.

---

This application is a continuation-in-part application of a copending application Ser. No. 860,905 filed Sept. 25, 1969 now U.S. Pat. 3,647,680.

The reforming of hydrocarbon feed stocks, such as a naphtha fraction derived from petroleum, utilizing a platinum group metal-alumina catalyst, is a process well known in the art. Briefly, a naphtha feed stock is admixed with hydrogen and contacted with the catalyst, usually in a fixed bed reaction zone, at reforming conditions of temperature and pressure to cause at least a portion of the naphtha feed stock to be upgraded to products of improved octane value. Prior art reforming processes generally comprise one of two types of operation, i.e., a non-regenerative type or a regenerative type. In the practice of a non-regenerative type of operation, the catalyst is maintained in continuous use over an extended period of time, say from about five months to about a year or more depending on the quality of the catalyst and the nature of the feed stock. Following this extended period of operation, the reforming reactor is taken off stream while the catalyst is regenerated or replaced with fresh catalyst. In the practice of the regenerative type of operation, the catalyst is regenerated with greater frequency, utilizing a multiple reactor system arranged for serial flow of the feed stock in such a manner that at least one reactor can be taken off stream while the catalyst is regenerated or replaced with fresh catalyst, one or more companion reactors remaining on stream, or going on stream, to replace the off stream reactor. Subsequently, the regenerated reactor is placed on stream while another is taken off stream while the catalyst is regenerated or replaced with fresh catalyst in like manner.

It is apparent from the brief description of prior art regenerative and non-regenerative reforming processes that both means of operation embody certain undesirable features. For example, in the non-regenerative type of operation, the entire plant is usually taken off stream to effect regeneration or replacement of the catalyst with a significant loss in production. Further, the non-regenerative type of operation is characterized by a continuing decline in catalyst activity during the processing period requiring an operation of increasing severity to maintain product quality, usually at the expense of product quantity. In the regenerative type of operation utilizing a multiple fixed bed reactor system, or "swing reactor" system, similar problems are encountered although to a lesser degree. However, the start-up and shut-down procedures associated with inserting and removing a reactor in the process stream are unduly complicated and require a complex system of lines and valves and other equipment to accomplish reactor change over with a minimum loss of process time.

It is therefore desirable to provide a reforming process which would substantially obviate the undesirable features of prior art regenerative and non-regenerative type reforming processes. More specifically, it would be desirable to have a reforming process whereby a predetermined high level of catalyst activity is maintained over extended periods without resorting to increasingly severe reforming conditions and/or removal of a reforming reactor from the process stream with a consequent loss of process time.

Accordingly, it is an object of this invention to present an improved catalytic reforming process whereby a predetermined high level of catalyst activity is maintained over an extended period of operation. Thus, in accordance with one embodiment of this invention, there is provided a method of operating a reforming process employing a platinum group metal catalyst which comprises charging a hydrogen-hydrocarbon reaction mixture to a reactor and treating the reactant stream therein at reforming conditions in contact with a dense-phase moving bed of catalyst particles; separately recovering the reactant stream from said reactor, and discharging used catalyst particles to a catalyst collector through a plurality of catalyst conduits; continuously charging recycle gas to said catalyst collector at a rate to preclude passage of the reactant stream through said conduits, said recycle gas passing upwardly through said conduits to be recovered in admixture with the reactant stream; periodically increasing the flow of said recycle gas to said collector to also preclude the passage of catalyst particles through said conduits, and withdrawing the used catalyst from said collector; and adding a substantially equivalent quantity of fresh catalyst to said reactor, to maintain a substantially constant catalyst inventory therein, said reactor remaining on stream at reforming conditions.

One preferred embodiment relates to a method of operating a multiple reactor reforming operation, which method comprises providing a multiple reactor system comprising side-by-side reactors, each containing a dense-phase of catalyst particles in a moving bed, and each reactor being provided with a catalyst collector; charging a hydrogen-hydrocarbon reaction mixture to the initial reactor and treating the reactant stream therein at reforming conditions in contact with said catalyst; separately recovering the reactant stream and passing the same to the next reactor in series, discharging catalyst particles from said initial reactor to a catalyst collector through a plurality of catalyst conduits, and adding a substantially equivalent quantity of fresh catalyst to said initial reactor to maintain a substantially constant catalyst inventory therein; charging a hydrogen-rich recycle gas to said catalyst collector at a rate to preclude passage of the reactant stream through said catalyst transfer conduits, said recycle gas passing upwardly through said conduits into said reactor to be recovered in admixture with the reactant stream; periodically adjusting said recycle gas rate to further preclude passage of catalyst particles through said catalyst conduits, and withdrawing at least a portion of the catalyst particles contained in said catalyst collector for transfer to the next succeeding reactor in series through a plurality of catalyst transfer conduits to a catalyst collector substantially as described, and adding catalyst particles to said next reactor from the catalyst collector of said initial reactor to maintain a substantially constant catalyst inventory therein; withdrawing used catalyst particles from the final reactor in series through a plurality of catalyst transfer conduits to a catalyst collector substantially as described, and adding catalyst particles to said final reactor from the catalyst collector of the preceding reactor to maintain a substantially constant catalyst inventory therein, all reactors remaining on stream at reforming conditions.

In view of the pressure drop across a multiple reactor system, processing of the catalyst through the system is facilitated by processing the catalyst in a reverse order series flow with respect to the series flow of the reactant stream. Thus, a more preferred embodiment relates to a method of operating a multiple reactor reforming operation which comprises providing a multiple reactor system comprising side-by-side reactors, each containing a dense-phase of catalyst particles in a moving bed, and each reactor being provided with a catalyst collector; charging a hydrogen-hydrocarbon reaction mixture to the initial reactor and treating the reactant stream therein at reforming conditions in contact with said catalyst; separately recovering the reactant stream and passing the same to the next reactor in series, discharging used catalyst particles from said initial reactor to a catalyst collector through a plurality of catalyst transfer conduits, and adding a substantially equivalent quantity of catalyst to said initial reactor from the next reactor in series as hereinafter described to maintain a substantially constant catalyst inventory in said initial reactor; charging a hydrogen-rich recycle gas to said catalyst collector at a rate to preclude passage of the reactant stream through said catalyst transfer conduits, said recycle gas passing upwardly through said conduits to be recovered in admixture with the reactant stream; periodically increasing the flow of said recycle gas to said collector to also preclude passage of catalyst particles through said conduits, and withdrawing used catalyst from said collector for regeneration; adding fresh catalyst particles to the final reactor, discharging a substantially equivalent quantity of catalyst therefrom to a catalyst collector through a plurality of catalyst transfer conduits, withdrawing catalyst from said catalyst collector substantially as described, and transferring said catalyst to the next preceding reactor in series to maintain a substantially constant catalyst inventory therein; discharging a substantially equivalent quantity of catalyst from said preceding reactor in series to a catalyst collector through a plurality of catalyst transfer conduits, withdrawing said catalyst from said catalyst collector substantially as described, and transferring said catalyst to said initial reactor to maintain a substantially constant catalyst inventory therein, all reactors remaining on stream at reforming conditions.

Other objects and embodiments of this invention will become apparent in the following detailed specification.

The catalyst employed in the practice of this invention comprises a platinum group metal, combined halogen and alumina. Preferably, the catalyst will comprise platinum and a promoter metal such as rhenuim, germanium, tin, lead, etc., and combined chlorine composited with a spherical alumina such as prepared by the oil-drop method described in U.S. Pat. No. 2,620,314 issued to James Hoekstra. Other platinum group metals including palladium, rhodium, ruthenium, osmium and iridium are suitable although less commonly employed. Also, other refractory inorganic oxides including silica, zirconia, boria, thoria, etc., as well as composites thereof such as silica-alumina, alumina-boria, and the like, may be used with satisfactory results. Generally, the platinum group metal will comprise from about 0.01 to about 5.0 wt. percent of the catalyst composite, from about 0.10 to about 0.80 wt. percent being preferred. While the halogen component may be chlorine, bromine, fluorine and/or iodine, chlorine is most usually utilized to impart the desired acid-acting character to the catalyst. The halogen component, suitably comprising from about 0.50 to about 1.5 wt. percent of the catalyst composite, is measured as elemental halogen although present in a combined form with one or more of the other catalyst components. Those skilled in the art are familiar with the preparation of the reforming catalyst herein contemplated and, since the novelty of the present invention does not reside in the catalyst per se, a further detailed description is not warranted.

Catalytic reforming conditions include a temperature of from about 700° to about 1000° F., a pressure of from about 50 to about 1000 p.s.i.g., a liquid hourly space velocity of from about 0.2 to about 10, and a hydrogen-hydrocarbon mole ratio of from about 1:1 to about 10:1. The method of this invention is particularly adapted to low pressure reforming preferably at a pressure of from about 50 to about 200 p.s.i.g. Since the reforming reaction is endothermic in nature, in the event a multiple reactor system is employed, the effluent from a given reactor is generally reheated to reaction temperature prior to introduction into the next succeeding reactor.

As used herein, the term "activity" relates to the capacity of the catalyst system to convert low octane naphtha feed stock to a relatively high octane product, for example, a gasoline fraction with an octane rating in excess of about 90, at a given temperature, pressure and space velocity. The concept of the present invention permits reforming of the hydrocarbon feed stock in contact with a catalyst system characterized by a substantially constant activity level. This is accomplished in part by the method of this invention which provides for the constant replacement of used catalyst in the system with fresh or regenerated catalyst whereby the catalyst system remains at a substantially constant activity level at a given temperature, pressure and space velocity. This is in contrast to conventional non-regenerative and regenerative reforming operations where catalyst activity is maintained at a constant level by increasing the severity of the operation.

In the schematic drawing, the reactant stream is depicted as being charged to the initial reactor 5 of a multiple reactor system and processed therethrough in series flow with product being recovered from the final reactor 16. On the other hand, fresh or regenerated catalyst is charged to the final reactor 16 and processed through said multiple reactor system in a reverse order series flow with used catalyst being recovered from the initial reactor 5, all reactors, including the intermediate reactor 11, remaining on stream at reforming conditions. The multiple reactor system comprises side-by-side reforming reactors each containing an annular dense-phase moving bed of catalyst particles and a catalyst collector.

An illustrative reforming operation, presented with reference to the schematic drawing, comprises charging a straight run gasoline fraction, boiling in the 200°–400° F. range, to the process through line 1 at a rate to effect a liquid hourly space velocity of about 2.0 in said multiple reactor system. The hydrocarbon charge enters a heater 2 in admixture with a hydrogen-rich recycle gas stream recycled through line 3 at a pressure of about 200 p.s.i.g. from a product separator not shown. In a conventional reforming operation, a considerable excess of hydrogen is admixed with the hydrocarbon charge stock to minimize carbon formation on the catalyst. Typically, hydrogen is employed in a mole ratio of about 10:1 with the hydrocarbon charge. However, in the process of this invention wherein the catalyst is subjected to relatively frequent regeneration, a substantial reduction in the amount of hydrogen recycled to the initial reactor 5 is realized. Preferably, the hydrogen-hydrocarbon mole ratio is from about 1:1 to about 5:1. Thus, in the present illustration wherein the catalyst is regenerated in about 15-day intervals, the heated combined stream comprises hydrogen in about a 3:1 mole ratio with the hydrocarbon charge, said heated combined stream being passed from the heater 2 to the initial reactor 5 by way of line 4.

The reactant stream is heated to a temperature of from about 850° to about 1000° F. in heater 2 and charged to the initial reactor 5 at a pressure of about 190 p.s.i.g. Reforming reactor 5 is shown with catalyst contained in an annular bed 6 formed by spaced cylindrical screens 7. The reactant stream is processed through the catalyst bed in an out-to-in radial flow, the reactant stream continuing downwardly through the cylindrical space 8 created by said annular bed 6 and exiting to heater 10 by way of line 9. Since the reaction is endothermic, the effluent from reactor 5 is reheated in reactor 10 prior to passing to reactor 11 through line 12. Again, the reactant stream is passed in an out-to-in radial flow through the annular catalyst bed 13 with the reactor effluent stream being recovered through line 14, passed through heater 15 into the final reactor 16 by way of line 19, and treated in contact with the annular catalyst bed 17 therein substantially as described with respect to heater 5. The reformate product is recovered through line 18 and passed to conventional product separation facilities for recovery of a high octane product and a hydrogen-rich gas stream. The hydrogen-rich gas stream is recycled to line 3 at about 200 p.s.i.g. and utilized as hereinafter described.

Fresh or regenerated catalyst is charged to reactor 16, the final reactor in series, by way of line 52 and distributed in the annular moving bed 17 by means of catalyst transfer conduits 53 and 54 representing a plurality of catalyst transfer conduits, the catalyst being processed downwardly as an annular dense-phase moving bed. The reforming catalyst charged to reactor 16 is comprised of $\frac{1}{16}''$ diameter spherical particles containing 0.375 wt. percent platinum, 0.2 wt. percent rhenium, and 0.9 wt. percent combined chlorine, the remainder being alumina. The catalyst particles are withdrawn from reactor 16 through catalyst transfer conduits 20 and 21, representing a plurality of catalyst transfer conduits, and discharged to a catalyst collector 22. Recycle hydrogen from line 3 is continuously charged through line 23 and control valve 24 to the catalyst collector 22 at a reduced pressure, said recycle gas passing upwardly through the catalyst transfer conduits 20 and 21 to act as a purge and preclude passage of the reactant stream therethrough. The recycle gas is then withdrawn from the reactor in admixture with the reactant stream through line 18.

At relatively frequent intervals, say at about 30 minute intervals, catalyst is withdrawn from the catalyst collector 22 while an equivalent quantity of fresh and/or regenerated catalyst is added to said final reactor 16. Substantially concurrently therewith, catalyst is withdrawn from catalyst collectors 32 and 36 associated with reactors 11 and 5 respectively, and an equivalent quantity of catalyst is added to said reactors from the catalyst collector of the next succeeding reactor in series to maintain a substantially constant inventory in said multiple reactor system, all reactors remaining on stream at reforming conditions.

More specifically, the recycle hydrogen gas charged through line 23 and control valve 24 is periodically increased to also preclude the passage of catalyst particles through said catalyst conduits 20 and 21. Substantially concurrently therewith control valves 25 and 26 are opened and catalyst particles discharged from the catalyst collector 22 through line 27 and carried to the top of reactor 11 by way of line 28 in a flow of recycle hydrogen gas from line 3. Control valves 24, 25 and 26 are activated by a level control, not shown, situated in the top of annular bed 13 of reactor 11. Control valves 29, 30 and 31 associated with catalyst collector 32 and reactor 11 function substantially as described with respect to control valves 23, 24 and 25, with the former being activated by a level control, not shown, situated in the top of annular bed 6 of reactor 5. Line 50 is provided to supply recycle hydrogen from line 3 to catalyst collector 32.

Control valves 33, 34 and 35 associated with catalyst collector 36 and reactor 5 are periodically activated to recover used catalyst from said catalyst collector 36, the used catalyst being transferred through lines 47 and 48 to a disengaging hopper 49. Said control valves 33, 34 and 35 function substantially as heretofore described; i.e., recycle hydrogen charged through line 51 and control valve 33 is periodically increased to preclude the passage of catalyst particles through the plurality of catalyst conduits represented by lines 45 and 46, and, substantially concurrently therewith, control valves 47 and 48 are opened and catalyst particles discharged from the catalyst collector through line 47.

Accordingly, control valves 33, 34 and 35 are periodically activated to recover used catalyst from catalyst collector 36 of reactor 5, and the used catalyst transferred by way of lines 47 and 48 to a disengaging hopper 49. The hydrogen-rich recycle gas utilized as a lift gas is recovered from the disengaging hopper through line 55, and used catalyst particles are withdrawn through line 56 and valve 57 to a lock hopper 58. Used catalyst particles are then recovered for regeneration through line 59 and valve 60. Substantially concurrently with the withdrawal of catalyst particles from reactor 5, catalyst particles from reactor 5, catalyst particles deposited in catalyst collector 32 through catalyst conduits 39 and 40, representing a plurality of catalyst transfer conduits, are discharged and transferred through lines 41 and 42 to be distributed in the top of annular bed 6 of reactor 5 by means of catalyst transfer conduits 43 and 44, again representing a plurality of transfer conduits. And at substantially the same time, catalyst particles deposited in catalyst collector 22 through transfer conduits 20 and 21 are discharged and transferred through lines 27 and 28 to be distributed in the top of annular bed 13 by means of a multitude of catalyst transfer conduits represented by lines 37 and 38. Fresh and/or regenerated catalyst is charged to the top of reactor 16 through line 52 and distributed in annnular bed 17 by means of catalyst transfer conduits 53 and 54 to maintain a substantially constant catalyst inventory in said multiple reactor system, all reactors remaining on stream at reaction conditions.

The practice of the present invention provides for a substantially continuous addition of fresh catalyst and withdrawal of used catalyst, the catalyst moving through the multiple reactor system at a predetermined activity level as a dense-phase moving bed to be withdrawn for regeneration after a relatively brief exposure to reforming conditions. While it is contemplated that on-sight regeneration facilities will be utilized, the used catalyst may be regenerated in off-sight facilities if so desired. The practice of this invention permits the use of lower operating pressures with a resulting increase in hydrogen production. Also, a continued supply of hydrogen is provided for hydrogen-consuming refinery operations such as hydrocracking.

The method of this invention finds particular application with respect to low pressure reforming. While low hydrogen partial pressures favor the main octane-improving reactions, e.g., dehydrogenation of paraffins and naphthenes, a principal objection to low pressure reforming is in the excessive formation of carbon resulting from condensation and polymerization reactions also favored by low hydrogen partial pressures. However, the relatively frequent regeneration substantially obviates this objection, and the catalyst instability resulting from carbon formation is no longer a limiting factor to a successful low pressure reforming operation.

We claim as our invention:

1. A method of operating a reforming process employing a platinum group metal catalyst which comprises:
   (a) charging a hydrogen-hydrocarbon reaction mixture to a reactor and treating the reactant stream therein at reforming conditions in contact with a dense-phase moving bed of catalyst particles;

(b) separately recovering the reactant stream from said reactor, and discharging used catalyst particles through a plurality of catalyst conduits to a catalyst collector;

(c) continuously charging recycle gas to said catalyst collector at a rate to preclude passage of the reactant stream through said conduits, said recycle gas passing upwardly through said conduits to be recovered in admixture with the reactant stream;

(d) periodically increasing the flow of said recycle gas to said collector to also preclude the passage of catalyst particles through said conduits, and withdrawing the used catalyst from said collector; and (e) adding a substantially equivalent quantity of fresh catalyst to said reactor to effect a substantially constant catalyst inventory therein, said reactor remaining on stream at reforming conditions.

2. The method of claim 1 further characterized in that said dense-phase moving bed of catalyst particles is an annular moving bed with a substantially lateral flow of the reactant stream therethrough.

3. The method of claim 1 further characterized in that said platinum group metal is platinum.

4. The method of claim 1 further characterized in that said catalyst further contains a promoter metal selected from the group consisting of rhenium, germanium, lead and tin.

5. The method of claim 1 further characterized in that said catalyst further contains rhenium.

6. The method of claim 1 further characterized in that said reforming conditions include a temperature of from about 750° to about 1100° F., a pressure of from about 50 to about 200 p.s.i.g., a liquid hourly space velocity of from about 0.2 to about 10, and a hydrogen-hydrocarbon mole ratio of from about 1:1 to about 10:1.

7. A method of operating a reforming process employing a platinum group metal catalyst which comprises:

(a) providing a multiple reactor system comprising side-by-side reactors, each containing a dense-phase of catalyst particles in a moving bed, and each reactor being provided with a catalyst collector;

(b) charging a hydrogen-hydrocarbon reaction mixture to the initial reactor and treating the reactant stream therefrom at reforming conditions in contact with said catalyst;

(c) separately recovering the reactant stream and passing the same to the next reactor in series, discharging catalyst particles from said initial reactor through a plurality of catalyst conduits to a catalyst collector, and adding a substantially equivalent quantity of fresh catalyst to said initial reactor to effect a substantially constant catalyst inventory therein;

(d) continuously charging a hydrogen-rich recycle gas to said catalyst collector at a rate to preclude passage of the reactant stream through said catalyst transfer conduits, said recycle gas passing upwardly through said conduits into said reactor to be recovered in admixture with the reactant stream;

(e) periodically increasing said recycle gas rate to further preclude passage of the catalyst particles through said catalyst conduits, and withdrawing used catalyst particles contained in said catalyst collector for transfer to the next reactor in series;

(f) withdrawing catalyst particles from said next reactor in series through a plurality of catalyst transfer conduits to a catalyst collector substantially as described, and adding catalyst particles to said next reactor from the catalyst collector of said initial reactor to effect a substantially constant catalyst inventory therein;

(g) withdrawing used catalyst particles from the final reactor in series through a plurality of catalyst transfer conduits to a catalyst collector substantially as described, and adding catalyst particles to said final reactor from the catalyst collector of the preceding reactor to effect a substantially constant catalyst inventory therein, all reactors remaining on stream at reforming conditions.

8. The method of claim 7 further characterized in that said dense-phase moving bed of catalyst particles is an annular moving bed with a substantially lateral flow of the reactant stream therethrough.

9. The method of claim 7 further characterized in that said platinum group metal is platinum.

10. The method of claim 7 further characterized in that said catalyst further contains a promoter metal selected from the group consisting of rhenium, germanium, lead and tin.

11. The method of claim 7 further characterized in that said catalyst further contains rhenium.

12. The method of claim 7 further characterized in that said reforming conditions include a temperature of from about 750° to about 1100° F., a pressure of from about 50 to about 200 p.s.i.g., a liquid hourly space velocity of from about 0.2 to about 10, and a hydrogen-hydrocarbon mole ratio of from about 1:1 to about 10:1.

13. A method of operating a reforming process employing a platinum group metal catalyst which comprises:

(a) providing a multiple reactor system comprising side-by-side reactors, each containing a dense-phase of catalyst particles in a moving bed, and each reactor being provided with a catalyst collector;

(b) charging a hydrogen-hydrocarbon reaction mixture to the initial reactor and treating the reactant stream therein at reforming conditions in contact with said catalyst;

(c) separately recovering the reactant stream and passing the same to the next reactor in series, discharging used catalyst particles from said initial reactor to a catalyst collector through a plurality of catalyst transfer conduits, and adding a substantially equivalent quantity of catalyst to said initial reactor from the next reactor in series as hereinafter described to maintain a substantially constant catalyst inventory in said initial reactor;

(d) charging a hydrogen-rich recycle gas to said catalyst collector at a rate to preclude passage of the reactant stream through said catalyst transfer conduits, said recycle gas passing upwardly through said conduits to be recovered in admixture with the reactant stream;

(e) periodically increasing the flow of said recycle gas to said collector to also preclude passage of catalyst particles through said conduits, and withdrawing used catalyst from said collector for regeneration;

(f) adding fresh catalyst particles to the final reactor, discharging a substantially equivalent quantity of catalyst therefrom to a catalyst collector through a plurality of catalyst transfer conduits, withdrawing catalyst from said catalyst collector substantially as described, and transferring said catalyst to the next preceding reactor in series to maintain a substantially constant catalyst inventory therein;

(g) discharging a substantially equivalent quantity of catalyst from the next preceding reactor in series to a catalyst collector through a plurality of catalyst transfer conduits, withdrawing said catalyst from said catalyst collector substantially as described, and transferring said catalyst to said initial reactor to maintain a substantially constant catalyst inventory therein, all reactors remaining on stream at reforming conditions.

14. The method of claim 13 further characterized in that said dense-phase moving bed of catalyst particles is an annular moving bed with a substantially lateral flow of the reactant stream therethrough.

15. The method of claim 13 further characterized in that said platinum group metal is platinum.

16. The method of claim 13 further characterized in that said catalyst further contains a promoter metal selected from the group consisting of rhenium, germanium, lead and tin.

17. The method of claim 13 further characterized in that said catalyst further contains rhenium.

18. The method of claim 13 further characterized in that said reforming conditions include a temperature of from about 750° to about 1100° F., a pressure of from about 50 to about 200 p.s.i.g., a liquid hourly space velocity of from about 0.2 to about 10, and a hydrogen-hydrocarbon mole ratio of from about 1:1 to about 10:1.

References Cited

UNITED STATES PATENTS

| | | | |
|---|---|---|---|
| 2,436,340 | 2/1948 | Upham et al. | 208—152 |
| 2,775,547 | 12/1956 | Ardern et al. | 23—288 G |
| 2,799,359 | 7/1957 | Johnson | 23—288 G |
| 2,914,466 | 11/1959 | Lieffers et al. | 208—165 |
| 3,647,680 | 31/1972 | Greenwood et al. | 208—65 |

DELBERT E. GANTZ, Primary Examiner

J. W. HELLWEGE, Assistant Examiner

U.S. Cl. X.R.

23—288 G, 208—139, 140, 152, 165